United States Patent Office 2,731,673
Patented Jan. 24, 1956

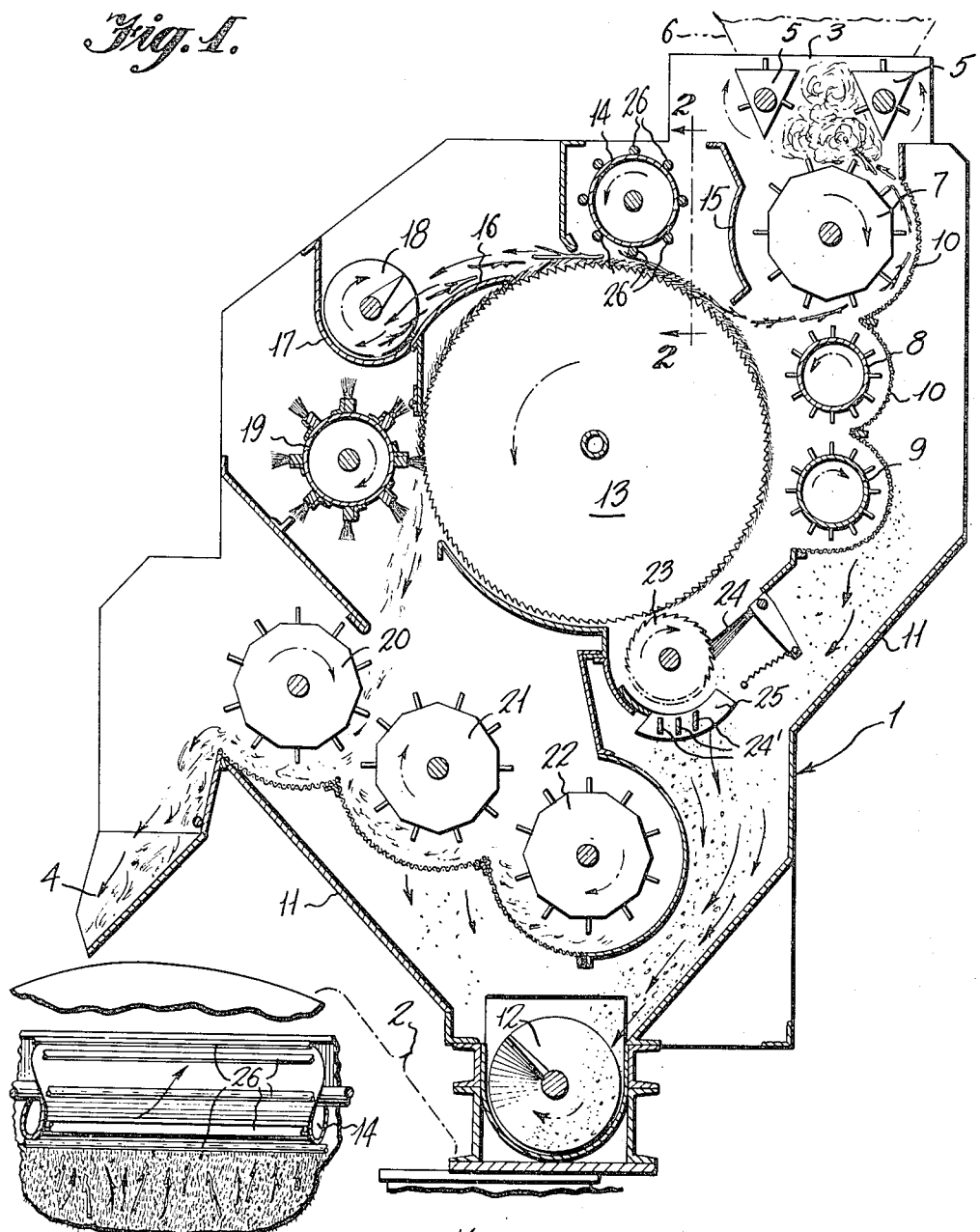

2,731,673

EXTRACTOR FEEDERS FOR EXTRACTING LIMBS FROM SEED COTTON

Jeffrey J. Wallace, Amite, La., assignor to Gullett Gin Company, Amite, La., a corporation of Louisiana Application October 21, 1954, Serial No. 463,662

7 Claims. (Cl. 19—35)

This invention relates to extractor feeders. The function of apparatus of this class presently on the market is, in general, to remove hulls and leaves from seed cotton prior to ginning the same. With the advent of mechanical cotton harvesters a new problem is presented in that the harvester gathers limbs which it breaks from the plant, and which become entangled with the cotton as it is harvested. These limbs average in thickness from 1/16 inch to 1/4 inch in diameter, and in length from 2 to 8 inches.

Only a small portion of such limbs can be removed from the cotton by the conventional extractor feeder, for the mechanism is such as to turn the greater part of the limbs, in the course of traverse of the bat through the apparatus, so that they make an endwise presentation to the line of tangency between the stripper cylinder and the cotton on the extractor saw cylinder. These instrumentalities are efficient in stripping from the cotton the hull and leaf debris riding high, but the relatively small diameter of the limbs permits them to pass between the stripper cylinder and saw cylinder and to continue through with the cotton so that the extraction of the limbs is not accomplished.

One of the objects of the present invention is to provide an extractor feeder that will intercept, and extract from the cotton the greater portion of the limbs, as well as the hull and leaf debris.

Another object of the invention is the method which includes the steps of causing the limbs in the cotton mass to become arranged mutually substantially parallel on the outside of the cotton mass, causing the thus arranged limbs to deposit upon the face of a moving cushion of cotton derived from the cotton mass, parallel to its direction of movement, said cushion moving toward a baffle substantially in the plane of said face, and depressing the trailing ends of said limbs into said cushion, thereby tilting their leading ends above the plane of the baffle, whereby the movement of the cushion interposes the baffle between said limbs and cushion, effecting extraction of said limbs.

Other objects of the invention will appear as the following description of a practical embodiment thereof proceeds.

In the drawings which accompany and form a part of the following specification and throughout the several figures of which the same characters have been used to denote identical parts:

Figure 1 is a vertical section through an extractor feeder and the adjacent parts of a gin, embodying the principles of the invention;

Figure 2 is a fragmentary vertical cross-section taken along the line 2—2 of Figure 1;

Figures 3 and 4 are companion views in section, Figure 3, showing a limb intermediately depressed into the cotton cushion by the stripper cylinder, while Figure 4 shows the limb having its leading edge uptilted through pressure by the stripper cylinder upon its trailing end.

Referring now in detail to the drawings, the numeral 1 represents a casing which is shaped to fit over a conventional gin 2, as shown in Figure 1, having an inlet 3 at the top adapted for connection to a distributor, and having a chute 4 adapted to be so arranged as to discharge into the roll box of the gin. The inlet of the casing is controlled by the cooperating feed rolls 5, which receive cotton from the distributor through a hopper 6 and may be driven at selectively variable speeds to control the amount of cotton supplied to the gin.

Below the feed rolls is the spiked cylinder 7, directly in the path of the cotton column descending from between the feed rolls. The cotton is relatively loose at this point and the spikes on the upper arc of the cylinder 7 comb through the column transversely, encountering most of the limbs that are interspersed throughout the cotton. Such limbs as are not contacted at their exact middle points, are turned by the spikes of the cylinders so as to assume positions parallel to the direction of rotation of the spiked cylinder.

Below the spiked cylinder 7 are a pair of somewhat smaller spiked cylinders 8 and 9 in superposed relation, and forming with the cylinder 7 a series of three spiked cylinders. Toward the outer side of the casing these three cylinders face a screen 10 formed with pockets concentric to the respective cylinders. The screen is above the bottom wall 11 of the casing which slopes toward a trash conveyor 12.

A toothed extractor cylinder 13 confronts the series of cylinders 7, 8 and 9 at the side opposite the screen, having its cylindrical surface in operative proximity to all three cylinders, so as to receive material thrown centrifugally therefrom. The cylinder 8 snatches cotton from the cylinder 7, and the cylinder 9 takes cotton from the cylinder 8. All of these cylinders throw cotton onto the toothed extractor cylinder 13, thus continually building up a cushion layer of cotton on the surface of the extractor cylinder ahead of the point at which the predominant portion of limbs are deposited upon the extractor cylinder, so as to assure that the limbs will be on the outside of the cushioning layer of cotton. Since the directions of rotation of the cylinders 7 and 8 are opposite, the jet of cotton thrown by the cylinder 7 and that thrown by the cylinder 8 will merge in a common trajectory, with most of the limbs riding on or near the upper surface of the cotton deposited upon the extractor cylinder.

It is well understood that some of the finer foreign material contaminating the cotton is whipped out of the cotton carried by all three cylinders 7, 8 and 9 against the screen 10, and passes through the screen, dropping to the wall 11 of the casing and gravitating to the trash conveyor 12. The larger hull and leaf debris passes with the cotton from said three cylinders onto the extractor cylinder.

A stripper cylinder 14 is positioned above the extractor cylinder 13 and laterally of the spiked cylinder 7. Said stripper cylinder is provided with longitudinal vanes 26 which skim the surface of the cotton on the extractor cylinder. Said stripper cylinder travels in the opposite direction to the extractor cylinder and knocks off the hull and leaf particles, which in general ride higher than the limbs, throwing them forcibly in the direction of the spiked cylinder 7. If they were permitted to travel unrestrictedly to said spiked cylinder, they would embed themselves deep into the incoming cotton, on account of their high velocity, and be difficult to remove, so a baffle 15 is placed in the path of the hull and leaf debris thus thrown off, which checks its velocity so that it drops upon the surface of the cotton on the extractor cylinder and is removed without great difficulty later on.

As the extractor cylinder rotates beneath the stripper cylinder, the limbs which are moving with the extractor cylinder parallel to its direction of rotation, encounter the vanes of the stripper wheel and are depressed into the cotton cushion by said vanes, which when they reach the trailing ends of the limbs, press them down into the cushioning cotton layer beneath them, and by so doing, tilt the leading ends in an upward direction. Beyond the stripper wheel is an extracting baffle 16 having a forward edge extending transversely lengthwise of the extractor cylinder 10 facing the on-coming limbs and located at the surface of the cushioning layer of cotton on the extractor cylinder so as to be radially slightly below the up-tilted leading ends of said limbs. Thus, when the limbs reach the extracting baffle, they ride over the baffle while the cushioning layer of cotton travels beneath it, and in this way the limbs are taken out of the cotton and extracted. The extracting baffle 16 leads to a conveyor trough 17, having a spiral conveyor 18 for discharging the limbs.

Further along in the direction of rotation of the extractor cylinder is the doffing brush 19, which whisks the lint with whatever hull and leaf particles it may contain but with most of the limbs removed, into the first of a series of three spiked cleaning drums 20, 21, and 22 which carry the cotton over a series of screen segments through which a portion of the debris carried by the cotton is extracted and gravitates down the sloping bottom wall of the casing into the trash conveyor 12. The three cylinders 20, 21 and 22 are driven in the same direction, their lower arcs moving upwardly so that the cotton carried thereby is conveyed upwardly and deposited in the chute 4, which communicates with the gin. The numeral 23 represents a toothed reclaimed cylinder which catches cotton dropping through the space between the cylinders 7, 8 and 9 and the extractor cylinder 13, and carries the cotton between the filaments of a brush 24, where it is scoured of some foreign matter, and then passes it across the bars 24' of a grid 25, the cotton then being returned to the teeth on the extractor cylinder 13. The brush is spring sustained so that when large debris, or an excessive amount of foreign material collects behind the brush, it yields against spring pressure and dumps the accumlation into the casing, where it finds its way into the trash conveyor.

While I have in the above description disclosed a practical embodiment of the invention, it will be understood by those skilled in the art that the disclosure represents a prototype embodiment and that other rearrangements of parts cooperable to carry out the inventive concept are to be regarded as within the purview of the invention.

What I claim is:

1. An extractor of limbs from seed cotton comprising a casing and instrumentalities mounted therein including means for feeding a controlled column of cotton downward, a drum below said feeding means studded with peripheral spikes, rotatable below said feeding means in the path of flow of said cotton column whereby the spikes of said drum comb through said cotton arranging the limbs that they engage, longitudinally in planes perpendicular to the axis of rotation of said drum, a partition about said drum for holding the cotton in tractive relation to said drum, said partition having a discharge opening positioned to afford tangential centrifugal discharge of the cotton including the arranged limbs, a toothed extractor cylinder positioned with the upper arc of its path of rotation laterally adjacent said discharge opening, in the trajectory path of cotton with arranged limbs discharged through said opening, means beneath said drum in operative proximity thereto and to said extractor cylinder for taking cotton, exclusive of the arranged limbs, from said drum and transferring it to said extractor cylinder below the point at which said extracting cylinder receives said limbs clothing said extractor cylinder with a cushioning layer of cotton which underlies said limbs in said upper arc, a stripper cylinder above said extractor cylinder having longitudinal peripheral vanes, so positioned with respect to said extractor cylinder that the path of revolution of the vanes intersects the path of revolution of the cotton on the extractor cylinder, whereby the arranged limbs are depressed by said vanes into said cushioning layer while the higher riding smaller trash is stripped off by said vanes, the leading ends of said limbs being tilted tangentially upward upon the approach of said vanes to the trailing ends of said limbs through the resilient recovery of said cushioning layer behind said vanes, and a baffle beyond said stripper cylinder having an edge thereof positioned in skimming relation to the surface of the cushioning layer of cotton on said extractor cylinder, intervening between said cushioning layer and the uptilted ends of said limbs for separating said limbs from the cotton.

2. An extractor of limbs from seed cotton as claimed in claim 1, said means for transferring cotton from said spiked drum to said extractor cylinder comprising a pair of spiked cylinders in serial relation to said drum and in multiple relation to said extractor cylinder.

3. An extractor of limbs from seed cotton as claimed in claim 1, said extractor cylinder and stripper cylinder being rotatable in a direction contra to said spiked drum, and a baffle between said drum and stripper cylinder in the trajector path of trash thrown off by said stripper cylinder, for checking the velocity of said trash, letting it fall on the surface of the cotton layer on said extractor cylinder.

4. An extractor of limbs from seed cotton as claimed in claim 1, including a doffer beyond said baffle in operative proximity to said extractor cylinder for removing cotton therefrom, and a conveyor above said doffer for carrying off limbs, including a trough to which the separated limbs are guided by said baffle, said trough and baffle forming an imperforate partition segregating the limbs and the cushioning layer of cotton beyond the point at which they are separated by the edge of said baffle.

5. An extractor of limbs from seed cotton as claimed in claim 1, said means for transferring cotton from said spiked drum to said extractor cylinder comprising a pair of spiked cylinders in serial relation to said drum and in multiple relation to said extractor cylinder, a doffer beyond said baffle in operative proximity to said extractor cylinder for removing cotton therefrom, and a conveyor above said doffer for carrying off limbs, including a trough to which the separated limbs are guided by said baffle, said trough and baffle forming an imperforate partition segregating the limbs and the cushioning layer of cotton beyond the point at which they were separated by the edge of said baffle, a discharge chute for said casing, a series of cleaning drums below said doffer serially related and rotating directionally to convey cotton freed by said doffer to said chute, said spiked drum and spiked cylinders and said serially related cleaning drums being individually encompassed on their sides remote from said extractor cylinder by said partition, the latter comprising screen walls within the casing, a trash conveyor at the bottom of said casing, the latter having walls inclined toward said trash conveyor underlying said screen walls.

6. An extractor of limbs from seed cotton comprising a casing and instrumentalities mounted therein including means for feeding a controlled column of cotton downward, a drum below said feeding means studded with peripheral spikes rotatable below said feeding means in the path of flow of said cotton column whereby the spikes of said drum comb through said cotton arranging the limbs that they engage longitudinally in planes perpendicular to the axis of rotation of said drum, a foraminous partition about said drum for holding the cotton in tractive relation to said drum and permitting passage of small debris therethrough into said casing, said partition having a discharge opening positioned to afford tangential centrifugal discharge of the cotton including the arranged limbs, a toothed extractor cylinder positioned with the upper arc of its path of rotation laterally adjacent said discharge opening, in the trajectory path of cotton with arranged limbs discharged through said opening, spiked cylinders serially arranged beneath said drum and operatively related thereto and to said extractor cylinder, that spiked cylinder adjacent said drum taking cotton, exclusive of the arranged limbs, from said drum and transferring it to said extractor cylinder below the point at which the latter receives said limbs, and clothing said extractor cylinder with a cushioning layer of cotton which underlies said limbs in said upper arc, the spiked cylinder remote from said drum being auxiliary to the other of said spiked cylinders in taking cotton therefrom and contributing to the building of the cushioned layer upon said extractor cylinder, a stripper cylinder above said extractor cylinder having longitudinal peripheral vanes so positioned with respect to said extractor cylinder that the path of revolution of the vanes intersects the path of revolution of the cotton on the extractor cylinder, whereby the arranged limbs are depressed by said vanes into said cushioning layer while the higher riding small trash is stripped off by said vanes, the leading ends of said limbs being tilted tangentially upward upon the approach of said vanes to the trailing edges of said limbs, through the resilient recovery of said cushioning layer behind said vanes, and a baffle beyond said stripper cylinder having an edge thereof positioned in skimming relation to the surface of the cushioning layer of cotton on said extractor cylinder, interposed between said cushioning layer and the uptilted leading ends of said limbs for separating said limbs from the cotton.

7. The method of extracting limbs from seed cotton, employing a toothed extracting drum, comprising arranging the limbs, in a stream of seed cotton contaminated with limbs so that they lie longitudinally parallel to the direction of flow of said stream, separating said stream into two branches one being substantially free from limbs, arranging the substantially free branch so as to form a peripheral cushion on said extracting drum, depositing upon said cushion the branch carrying the parallel limbs, teetering said limbs by depressing their trailing ends into said cushion thereby lifting their leading ends above said cushion, causing a baffle to become interposed in the angle between said cushion and said lifted ends, and centrifugally projecting said limbs above said baffle.

References Cited in the file of this patent

UNITED STATES PATENTS

| | | |
|---|---|---|
| 994,609 | Shields | June 6, 1911 |
| 1,222,732 | Calderwood | Apr. 17, 1917 |
| 1,567,314 | Wood | Dec. 29, 1925 |
| 1,906,076 | Mitchell | Apr. 25, 1933 |
| 2,337,181 | Burkey | Dec. 21, 1943 |
| 2,580,451 | Merkel et al. | Jan. 1, 1952 |